United States Patent
Mihara et al.

(10) Patent No.: US 8,692,146 B2
(45) Date of Patent: Apr. 8, 2014

(54) TOUCHPAD OF AN ELECTRONIC APPARATUS AND METHOD FOR MANUFACTURING THE SAME

(75) Inventors: Daisuke Mihara, Kawasaki (JP); Motoki Yasuda, Kawasaki (JP); Kaigo Tanaka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 59 days.

(21) Appl. No.: 13/186,590

(22) Filed: Jul. 20, 2011

(65) Prior Publication Data

US 2012/0026739 A1    Feb. 2, 2012

(30) Foreign Application Priority Data

Jul. 30, 2010 (JP) ................... 2010-172901

(51) Int. Cl.
*H01H 9/00* (2006.01)

(52) U.S. Cl.
USPC ........................................ 200/314

(58) Field of Classification Search
USPC ......... 200/314, 313, 310, 308, 341, 511, 512, 200/520, 278, 293, 294, 296, 302.1, 302.2, 200/333
See application file for complete search history.

(56) References Cited

U.S. PATENT DOCUMENTS

| | | | | |
|---|---|---|---|---|
| 6,188,391 B1* | 2/2001 | Seely et al. | .................. | 345/173 |
| 6,933,921 B2* | 8/2005 | Yasuda et al. | .................. | 345/157 |
| 7,026,567 B2* | 4/2006 | Mai et al. | .................. | 200/512 |
| 7,642,479 B2* | 1/2010 | Lin et al. | .................. | 200/600 |
| 2003/0184514 A1 | 10/2003 | Grosfeld et al. | | |
| 2007/0108216 A1 | 5/2007 | Kurth et al. | | |
| 2008/0268202 A1* | 10/2008 | Kunthady et al. | .............. | 428/139 |
| 2009/0101487 A1* | 4/2009 | Su | .................. | 200/512 |

FOREIGN PATENT DOCUMENTS

| | | |
|---|---|---|
| JP | 08-022360 | 1/1996 |
| JP | 9-231853 A | 9/1997 |
| JP | 2003-122504 | 4/2003 |
| JP | 2003-296023 | 10/2003 |
| JP | 2006-126853 | 5/2006 |
| JP | 2009-515098 A | 4/2009 |

OTHER PUBLICATIONS

Japanese Office Action mailed Nov. 19, 2013 for corresponding Japanese Application No. 2010-172901, with English-language translation.

* cited by examiner

*Primary Examiner* — Edwin A. Leon
*Assistant Examiner* — Anthony R. Jimenez
(74) *Attorney, Agent, or Firm* — Fujitsu Patent Center

(57) ABSTRACT

An electronic apparatus includes a cover unit, a touchpad unit and a contact member. The cover unit has a window through which an operation section is exposed and the window has an inwardly inclined peripheral surface as an inclined portion. The touchpad unit is arranged substantially in the window. The contact member is secured on the touchpad unit and is exposed through the window. The contact member has a joining part for the cover unit. The joining part of the contact member forms a contiguous inclined surface together with the inclined portion of the cover unit.

9 Claims, 20 Drawing Sheets

TOUCHPAD OF AN ELECTRONIC APPARATUS AND METHOD FOR MANUFACTURING THE SAME

CROSS-REFERENCE TO RELATED APPLICATIONS

This application is based upon and claims the benefit of priority from the prior Japanese Patent Application No. 2010-172901 filed on Jul. 30, 2010, the entire contents of which are incorporated herein by reference.

FIELD

Embodiments relate to an electronic apparatus and a method for manufacturing the same.

BACKGROUND

For example, a portable personal computer (PC) has been known as an electronic apparatus having a touchpad. The touchpad is provided for detecting the contact of a user's finger or the like on the touchpad to operate a cursor or the like displayed on a display according to the detection position, the contact operation, or the like. The touchpad is exposed on the operation-side part of the housing of the electronic apparatus.

In view of enhancing the sense of design, protection of a contact sensor, operability, or the like of the touchpad, it has been known to laminate the touchpad with another member and design the touchpad to be exposed from the housing. For the same reasons, an electronic apparatus having an inclined periphery portion of the housing from which the touchpad is exposed has been also known in the art. Furthermore, in order to improve the sense of design, a touchpad capable of partially or entirely emitting light has been known in the art.

In order to make an operation section emit light, a technique of installing a light-guiding plate behind a switch button molded from transparent resin and arranging a light-guiding member for introducing light from an optical source has been known. For joining components together, bonding parts formed on a closing cap and closely arranging the parts along the surface thereof facing the periphery web of a shield to fill the space between the closing cap and the contact side is also known.

When a housing cover and a contact member are joined together at an inclined portion of the housing cover, the end face of each of the housing cover and the contact member should be formed at a sharp angle. In this case, however, the formation of each member is difficult. In addition, the gap between the inclined portions is visible from the operator of the electronic apparatus. Thus, the joined portion between the cover portion and the contact member should be formed outside the inclined portion of the housing member, limiting the shape of the touchpad unit.

SUMMARY

According to an embodiment, an electronic apparatus includes a cover unit, a touchpad unit and a contact member. The cover unit has a window through which an operation section is exposed and has an inwardly inclined peripheral surface as an inclined portion. The touchpad unit is arranged substantially in the window. The contact member is secured on the touchpad unit and is exposed through the window. The contact member has a joining part for the cover unit. The joining part of the contact member forms a contiguous inclined surface together with the inclined portion of the cover unit.

The object and advantages of the various embodiments will be realized and attained at least by the elements, features, and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the various embodiments.

DETAILED DESCRIPTION OF THE EMBODIMENTS

First Embodiment

Figure 1:
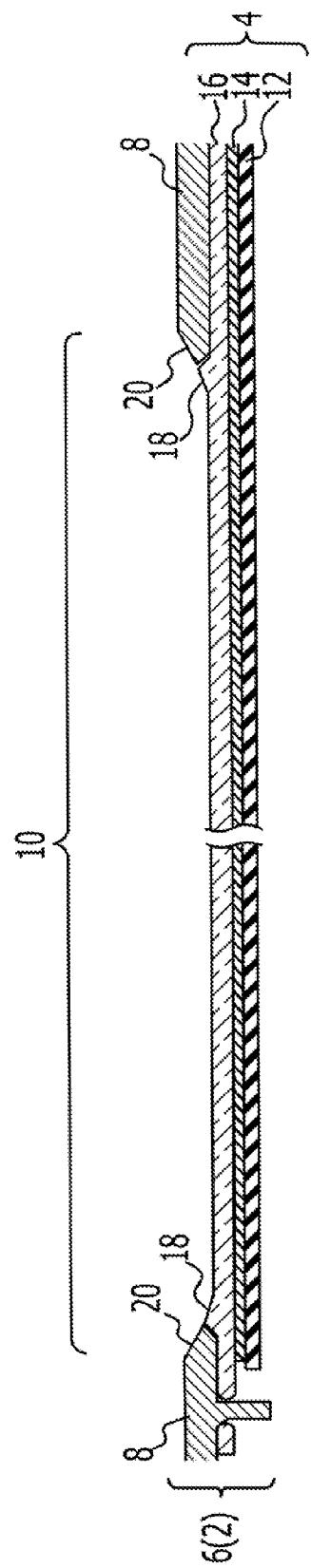
FIG. 1 is a cross-sectional diagram illustrating an example configuration of a touchpad unit of an electronic apparatus according to a first embodiment.
Figure 2:
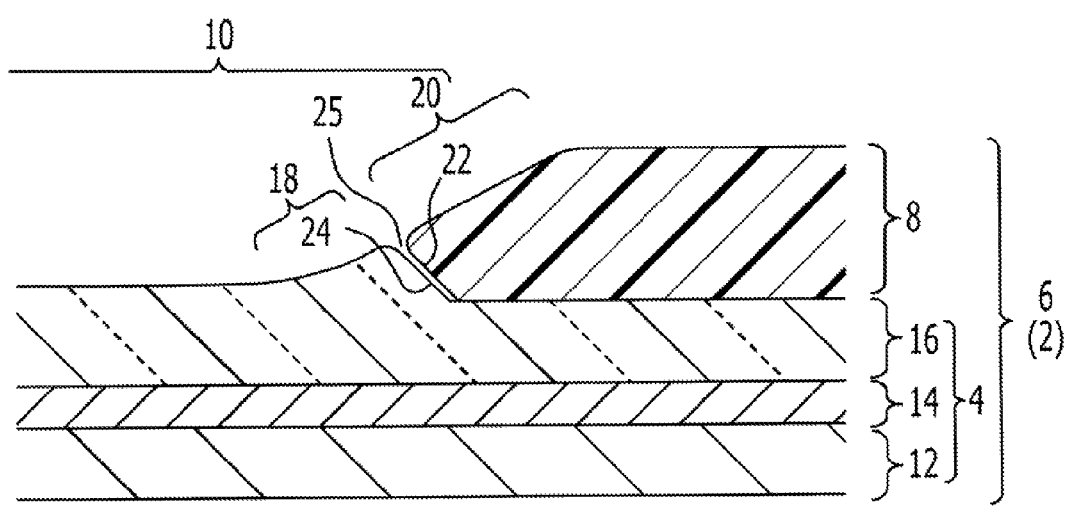
FIG. 2 is an enlarged view illustrating an example joining surface between an upper housing cover and a contact member.
Figure 3:
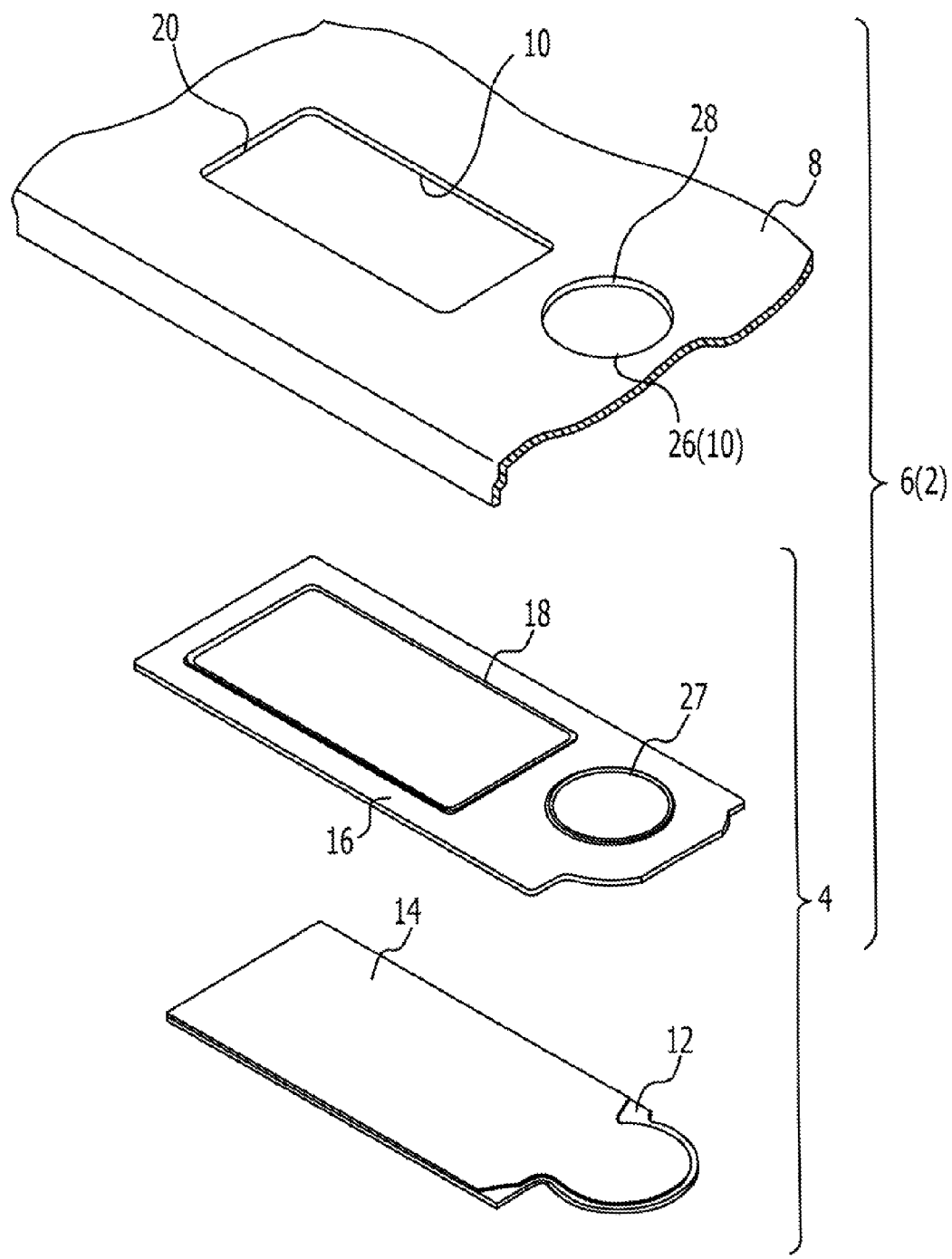
FIG. 3 is diagram illustrating an example configuration of a touchpad unit.

A first embodiment will be described with reference to FIGS. 1, 2 and 3. FIG. 1 is a cross-sectional diagram illustrating an example configuration of a touchpad unit of an electronic apparatus according to a first embodiment. FIG. 2 is an enlarged view illustrating an example joining surface between a cover unit and a contact member. FIG. 3 is a diagram illustrating an example configuration of a touchpad unit. The above configurations illustrated in FIGS. 1, 2 and 3 are examples of the present embodiment. Thus, the present embodiment is not limited to any of these configurations.

An electronic apparatus 2 is an example electronic apparatus of the present disclosure. The electronic apparatus 2 includes a touchpad unit 4 for allowing the user to perform a touch operation. For example, the touchpad unit 4 is exposed through a window 10 formed in part of an upper housing cover 8 of a main housing unit 6 of the electronic apparatus 2. And, the touchpad unit 4 detects touch thereon.

As illustrated in FIG. 1, for example, the touchpad unit 4 is constructed of a touchpad 12, an intermediate member 14, and a contact member 16, which are, for example, laminated in order in the upper housing cover 8 of the electronic apparatus 2. The user performs an input operation on the touchpad unit 4 by touching the contact member 16 exposed through the window 10 with the user's finger or the like.

The touchpad 12 is an example operation device that performs a cursor operation or the like in response to contact detection. The touchpad 12 is a so-called "pointing device." For example, the touchpad 12 is provided with a sensor, such as a pressure-sensitive sensor or capacitance sensor. The electronic apparatus 2 is operated in response to a position, contact operation, and so on of the user's finger or the like detected by the sensor.

The intermediate member 14 is an example functional member laminated between the touchpad 12 and the contact member 16. The user's finger directly touches the contact member 16. The intermediate member 14 is, for example, a light-guiding member or the like, which guides light emitted from a light-emitting element mounted on the touchpad 12. Furthermore, for example, an additional component having a function of protecting the touchpad 12, or the like may be laminated on the components. In other words, a pressure or the like applied to the contact member 16 may have a structure by which the pressure or the like may be transmitted to the touchpad 12.

Alternatively, the contact member 16 may be directly laminated on the touchpad 12 without the presence of the intermediate member 14.

The contact member 16 is an example contact member which is touched by the finger or the like of the user of the electronic apparatus 2. The contact member 16 may be, for example, a plate-like part made of resin. The contact member 16 is capable of, for example, enhancing the operability of the touchpad unit 4. In addition, for example, the contact member 16 allows the touchpad unit 4 to paint colors. The contact member 16 may be, for example, provided as a surface member for emitting light from an emitting light. Furthermore, the contact member 16 has a joining part 18 that joins the peripheral portion of the window 10 formed in the upper housing cover 8. For example, the joining part 18 is formed into a bump so that the contact between the joining part 18 and the upper housing cover 8 may be at the vertex of the joining part 18.

The upper housing cover 8 is an example cover unit of the present disclosure. The upper housing cover 8 is joined with a lower housing cover (not shown) to form a main housing unit 6. The main housing unit 6 houses functional components including the touchpad unit 4. An inclined portion 20, which is tapered toward the inside of the window 10, is formed on the peripheral portion of the window 10 formed in the upper housing cover 8.

As illustrated in FIG. 2, the joining part 18 of the contact member 16 inclines to form a contiguous inclined surface together with the inclined portion 20 formed on the window 10 of the upper housing cover 8. In other words, the joining part 18 of the contact member 16 is joined with the upper housing cover 8 in the inclined portion. In this case, for example, the joining surface 22 of the upper housing cover 8 and the joined surface portion 24 of the contact member 16 may be formed so that they are joined together at a specified angle with respect to the window 10. Thus, by joining the upper housing cover 8 and the contact member 16 together, for example, the user's finger or the like is impeded or prevented from touching the end of the window 10 when the user performs an operation using the peripheral side of the window 10. In addition, joining the inclined components together allow for larger contact areas. Thus, the accuracy of junction between the components increases, while a gap 25 between the components becomes small. Furthermore, the angle of the joining surface causes the user to see that the gap 25 is smaller.

For example, as illustrated in FIG. 3, the touchpad 12 and the intermediate member 14 may be joined together using an adhesive or the like to make a single component. Furthermore, the touchpad unit 4 may be provided with a plurality of operation input devices. A plurality of operation input devices may be formed by, for example, sharing the touchpad 12 and the intermediate member 14, which form the touchpad unit 4. In this case, corresponding to other operation input devices, a joining part 27 for joining the contact member 16 to the upper housing cover 8 is formed on the contact member 16. Like the aforementioned joining part 18, the joining part 27 may be inclined to form a contiguous inclined surface together with the inclined portion 28 of the window 26 formed in the upper housing cover 8. The contact member 16, the intermediate member 14, and the touchpad 12 are arranged and joined together while being aligned with the window 10 of the upper housing cover 8.

According to the aforementioned configuration of the example electronic apparatus of the present disclosure, the degree of contact between the housing cover 8 and the contact member 16 in the touchpad unit 4 is improved, reducing or preventing the generation of the gap between the components. Moreover, this leads to a decrease in visibility of the gap between the housing cover 8 and the contact member 16. Furthermore, very little light leaks from the gap when the touchpad unit 4 is illuminated, causing an increase in the visibility of a light-emitting state. Furthermore, this also leads to an improvement in processability of the joining parts of the housing cover 8 and the contact member 16, thereby attaining an improvement in ease of assembling the electronic apparatus.

Second Embodiment

Figure 4:
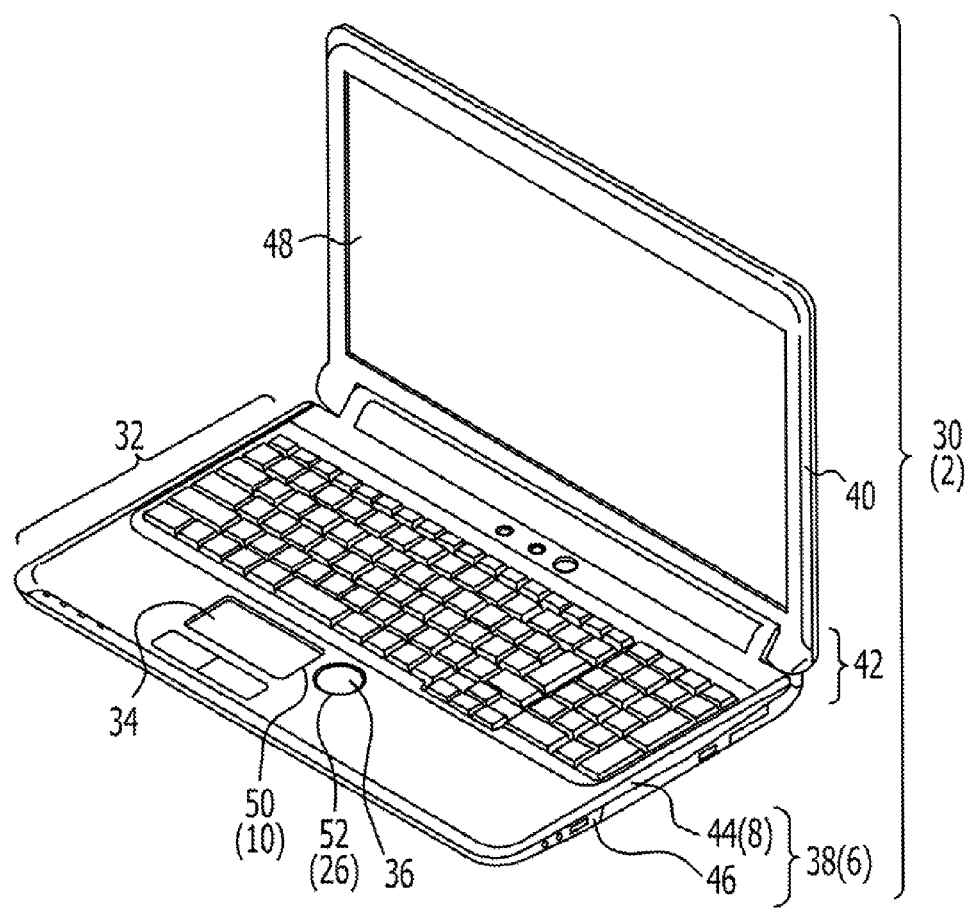
FIG. 4 is diagram illustrating an example configuration of a personal computer (PC) according to a second embodiment.

Referring to FIG. 4, a second embodiment will be described. FIG. 4 illustrates an example configuration of a Personal Computer (PC) according to a second embodiment. The configuration illustrated in FIG. 4 is provided as an example of this embodiment and does not restrict the embodiment.

A Personal Computer (PC) 30 is an example electronic apparatus of the present disclosure. The PC 30 includes touchpad units 34 and 36 in an operation section 32. The PC 30 also includes a main housing unit 38 and a display-side housing unit 40, for example, which are openably/closably connected by a hinge structure 42.

The main housing unit 38 is an example of the aforementioned main housing unit 6. The main housing unit 38 is fabricated by joining an upper housing cover 44 and a lower housing cover 46 together. For example, the operation section 32, a drive device such as an Optical Disc Drive (ODD), and control parts such as a control board are incorporated in the main housing unit 38. The upper housing cover 44 is an example cover unit of the present disclosure. The upper housing cover 44 has windows 50 and 52 in which touchpad units 34 and 36 are arranged, respectively.

The touchpad units 34 and 36 are parts of the operation section 32 and configured as examples of the aforementioned touchpad unit 4. The touchpad units 34 and 36 are devices for performing an operation input for moving a cursor on a display 48 in response to the contact movement of the user's finger or the like. The touchpad unit 34 is used for an input operation for moving a cursor in response to a sliding movement of the user's finger and an input operation corresponding to a mouse click or the like by receiving a short input press. In addition, the touchpad unit 36 is also used for instructing, for example, a scroll movement to an application performed on the PC 30 or a displayed Web page or the like in response to the sliding movement of the finger. Furthermore, the touchpad units 34 and 36 have functions of illumination with a light-emitting element placed inside the PC 30.

The display-side housing unit 40 includes a display 48. The display 48 may be, for example, a Liquid Crystal Display (LCD).

Figure 5:
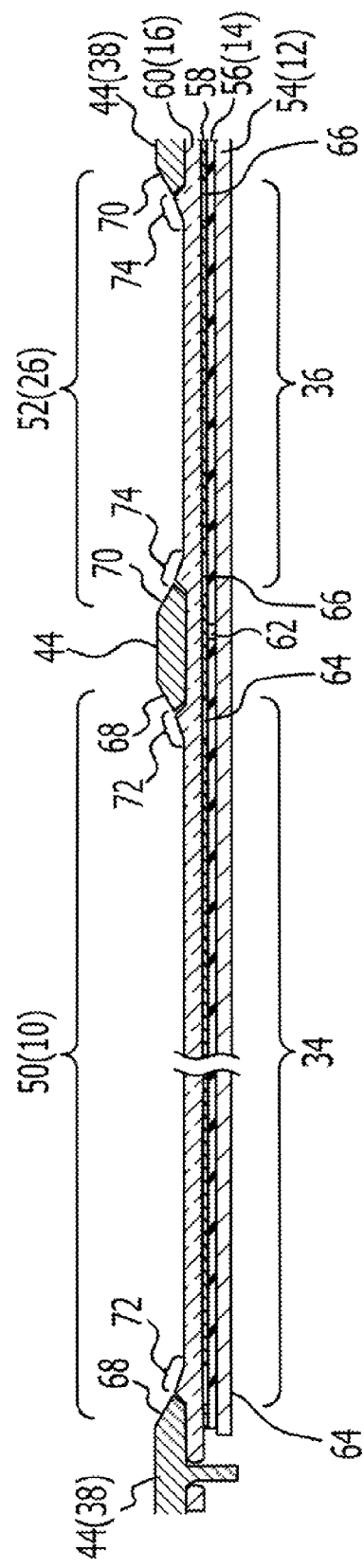
FIG. 5 is a cross-sectional diagram illustrating an example configuration of the touchpad unit.
Figure 6:
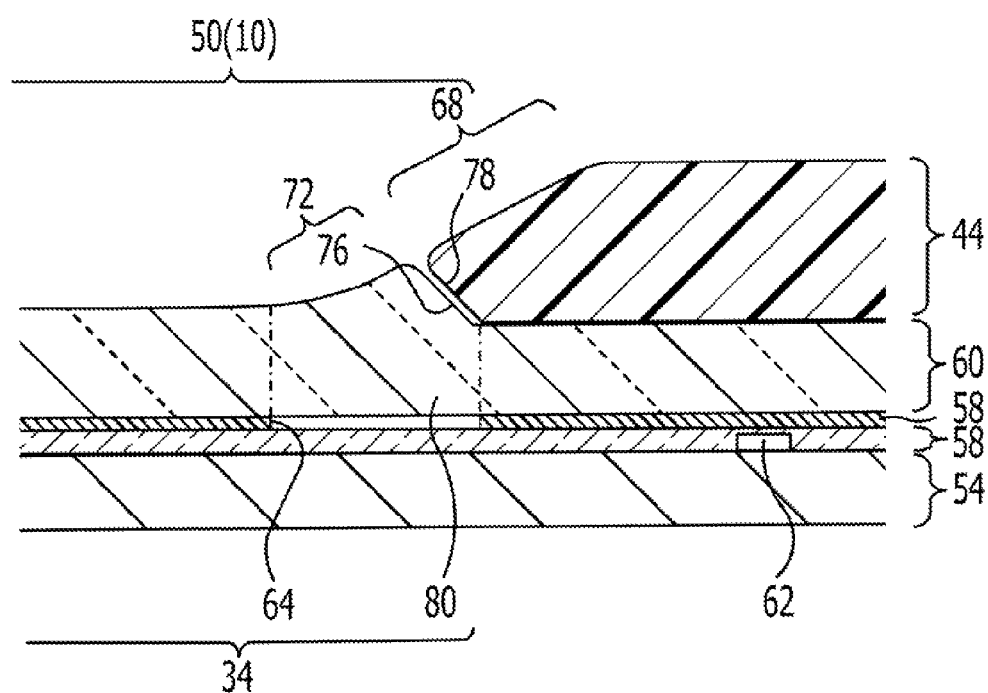
FIG. 6 is an enlarged view illustrating a joined portion of the touchpad unit having a light-emitting element.
Figure 7:
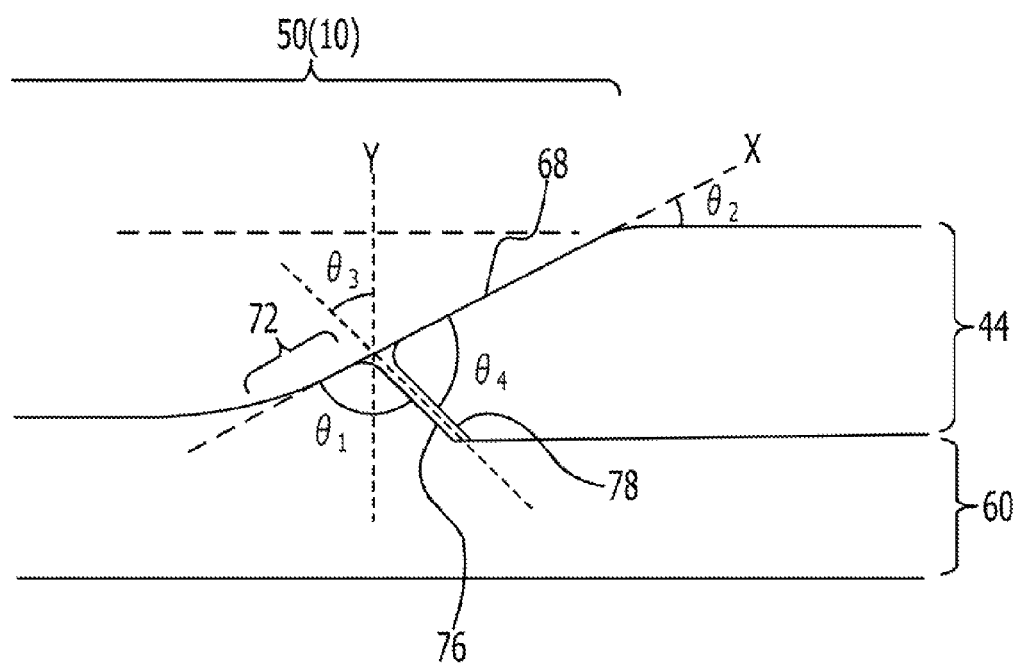
FIG. 7 is a diagram illustrating an example inclined angle and an example joining angle of a window.
Figure 8:
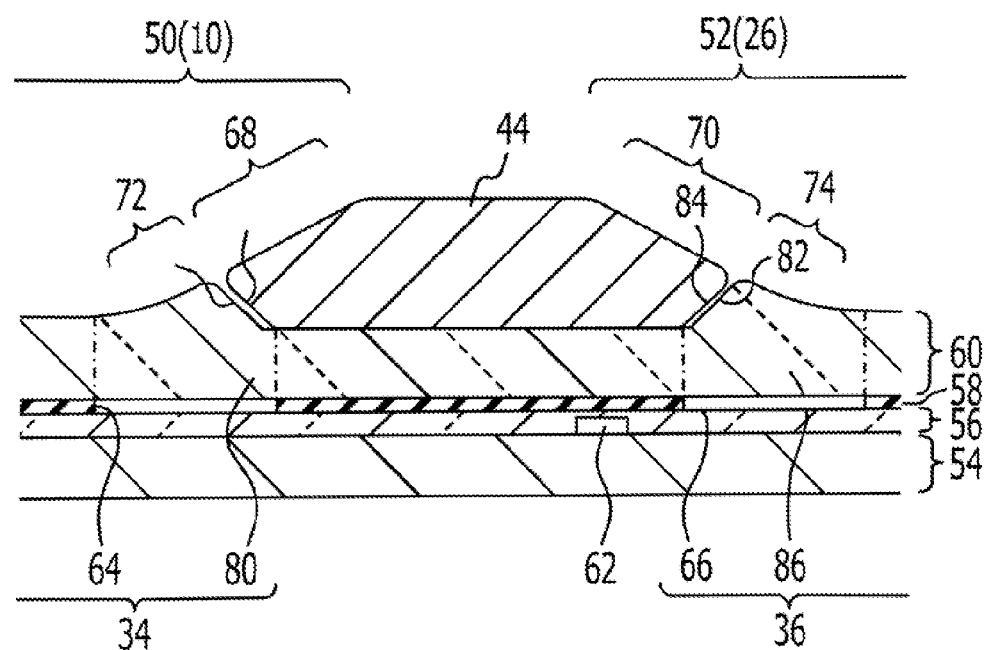
FIG. 8 is an enlarged view illustrating another joined portion of a touchpad unit having a light-emitting element.
Figure 9:
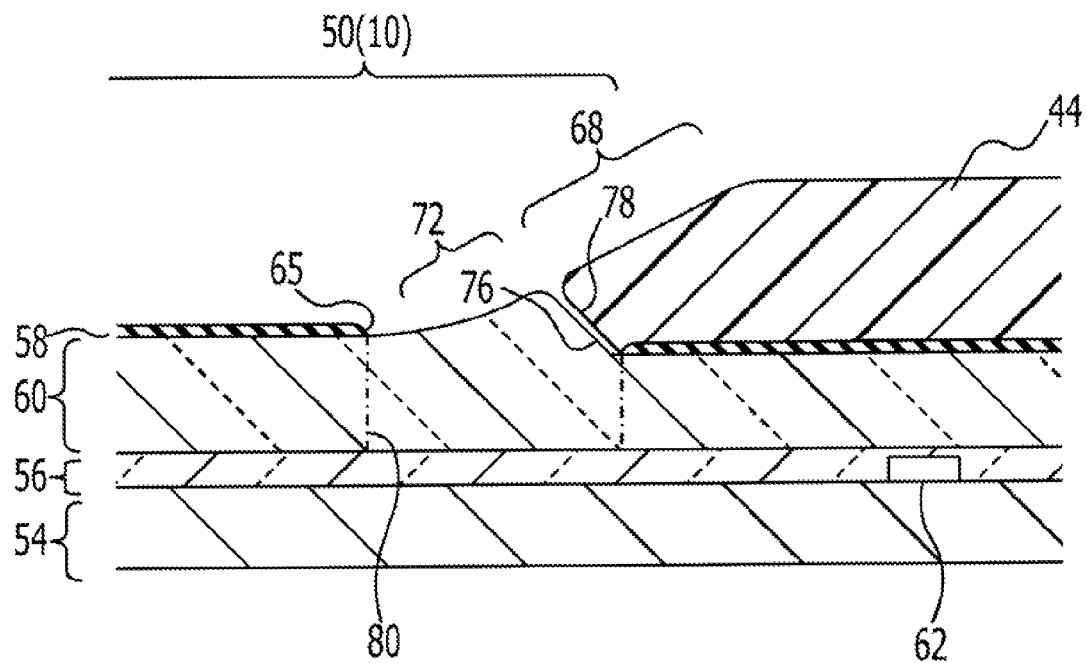
FIG. 9 is an another example of an illumination window portion.

Referring to FIGS. 5, 6, 7, 8 and 9, the arrangement and configuration of the touchpad unit installed in the housing will be described. FIG. 5 is a cross-sectional diagram illustrating an example configuration of the touchpad unit. FIG. 6 is an enlarged view illustrating a joined portion of the touchpad unit having a light-emitting element. FIG. 7 is a diagram illustrating an example inclined angle and an example joining angle of a window. FIG. 8 is an enlarged view illustrating another joined portion of the touchpad unit having the light-emitting element. FIG. 9 is an exploded view illustrating an illumination window portion. The arrangement/configuration of the touchpad unit illustrated in FIGS. 5, 6, 7, 8 and 9 is provided as an example and does not restrict the present embodiment. In FIGS. 5, 6, 7, 8 and 9, the same reference numerals denote substantially the same structural components as those illustrated in FIG. 4.

As illustrated in FIG. 5, the touchpads 34 and 36 include a touchpad 54, a light-guiding member 56, a coating layer 58, and a contact member 60 which are, for example, laminated in order in the upper housing cover 44. The touchpad 54 is an example of the aforementioned touchpad 12. The touchpad 54 detects a user's input operation in the window 50 or 52. The touchpad 54 includes sensor components, such as an electrode and a resistor, on the surface side thereof located on the side of the windows 50 and 52. The electrode is in an energized state. A printed circuit board or the like is provided to detect variations in electric current passing through the surface electrode, resistance, or the like and variations in electrostatic capacity or the like. Furthermore, a Light Emitting Diode (LED) 62 is arranged as a light-emitting element on the surface side of the touchpad 54.

The light-guiding member 56 is an example of the aforementioned intermediate member 14. The light-guiding member 56 guides light emitted from the LED 62. The light-guiding member 56 is made of a material, such as polycarbonate or ABS resin, having a light-propagation function. The light-guiding member 56 may be attached to and integrated with the touchpad 54 to form a unit component. The light-guiding member 56 guides light from the LED 62 onto the touchpad units 34 and 36 to illuminate the touchpad units 34 and 36.

The coating layer 58 is an example coloring portion of the contact member 60, which is exposed through the windows 50 and 56. The coating layer 58 may be formed by, for example, spraying paint and the like on the contact member 60. The coating layer 58 includes uncoated illumination window portions 64 and 66 which respectively extend along the periphery portions of the windows 50 and 52. In other words, the coloring portion of the coating layer 58 does not allow the light guided from the light-guiding member 56 to radiate from the windows 50 and 52, while the illumination window portions 64 and 66 of the coating layer 58 allows the guided light to radiate from the windows 50 and 52. Therefore, the illumination designs of the respective touchpad units 34 and 36 may be defined depending on the arrangement and configuration of the illumination window portions 64 and 66.

The contact member 60 is an example of the aforementioned contact member 16. The contact member 60 is exposed through the windows 50 and 52 of the upper housing cover 44. The contact member 60 includes joining parts 72 and 74 which are formed into bumps to form contiguous inclined surfaces together with inclined portions 68 and 70 formed on the peripheral portions of the windows 50 and 52, respectively.

As illustrated in FIG. 6, the contact member 60 is joined to the upper housing member 44 at the inclined portion. The joined surfaces 76 and 78, which are formed by joining the joining part 72 of the contact member 60 and the inclined portion 68 of the upper housing cover 44, are joined at a specified angle with respect to the inclined surface of the window 50. As illustrated in FIG. 7, for example, the joining part 72 of the contact member 60 is molded into a mound-like shape where the part of the contact member 60 arranged on the peripheral side of the window 50 is defined as a vertex with a specified angle of $\theta_1$. One lateral side of the joining part 72 of the contact member 60 is processed to fit to a specified angle $\theta_2$ with respect to the horizontal plane (upper surface) of the upper housing cover 44, which corresponds to the inclined angle of the inclined portion 68 of the upper housing cover 44. In addition, the joining surface portion 76 is molded so as to have an angle corresponding to the joined surface portion 78 of the upper side housing cover 44, for example, a specified angle $\theta_3$ with respect to the vertical reference plane Y.

In addition, the upper housing cover 44 is provided with the window 50 having a peripheral surface which corresponds to the inclined portion 68 which is inclined at an angle of $\theta_2$. The end of the window 50 is formed into a tapered shape having a specified angle of $\theta_4$. In this case, the inclined angle $\theta_1$ of the joining part 72 of the contact member 60 is about 90 degrees or more with respect to the inclined reference plane X for the inclined surface of the upper housing cover 44 or the contact member 60. Then, the angle $\theta_4$ is 180-$\theta_1$[°] with respect to the reference plane X.

The angles $\theta_1$ and $\theta_4$ vary depending on the angle $\theta_3$ that determines the angles of the respective joined surface portions 76 and 78. Then, for example, the angles $\theta_1$ and $\theta_4$ may be about 90° with respect to the reference plane X of the inclined surface. If the angle $\theta_1$ of the joining part 72 is increased while the angle $\theta_4$ of the upper housing cover 44 is decreased, the gap of the joined portion inclined at the angle $\theta_4$ is more inclined toward the horizontal surface of the upper housing cover 44. In this case, the inclined portion 68 of the upper housing cover 44 is desirably formed into a more sharply tapered shape. In contrast, if the angle $\theta_1$ of the joining part 72 is decreased and the angle $\theta_4$ of the upper housing cover is increased, the gap of the joined portion is more inclined toward the vertical reference plane Y.

As described above, the contact member 60 is provided with an inclined angle of $\theta_2$ as in the case with the inclined portion 68 formed on the upper housing cover 44. Therefore, even if the user performs an input operation by the user's finger or the like on the boundary of the window 50, the finger or the like may be inhibited or prevented from touching the end of the upper housing cover 44. In addition, the joined surface portions 76 and 78 are inclined and joined together to make the contact areas larger and the accuracy of the junction higher, reducing the gap between the joined portions. Furthermore, the angle of the joining surface allows the user to see that the gap is smaller.

As illustrated in FIG. 6, the illumination window portion 64 is formed in the coating layer 58 while being aligned to the joining part 72 and the joined surface portion 76. Therefore, the illumination of the peripheral side of the touchpad unit 34 (FIG. 5) exposed through the window 50 is made possible. The light emitted from the illumination window portion 64 passes through a conceivable illumination path 80 and is guided to the inclined surface of the joining part 72. Thus, light emitting from the inclined joining part 72 and the inclined gap formed between the joined surface portions 76 and 78 provides the user of the PC 30 with good visibility in an illumination state, while the junction makes the gap inconspicuous.

As illustrated in FIG. 8, the touchpad unit 36 includes the joining part 74 of the contact member 60 on the peripheral surface of the window 52. Like the window 50, the joining part 74 is formed into a bump to form a contiguous inclined surface together with the inclined portion 70 at an angle corresponding to the inclined angle of the inclined portion 70 formed on the upper housing cover 44. The inclined angle of the joined surface portion 82 of the joining part 74 and the inclined angle of the joined surface portion 84 of the upper housing cover 44 may be defined in a manner substantially similar to those of the joined surface portions 76 and 78.

The illumination window 66 is formed as an illumination device on the coating layer 58. Like the aforementioned illumination window 64, the illumination window 66 is formed and aligned with the joining part 74 of the contact member 60. The LED 62 of the touchpad 54 is installed, for example, just under the upper housing cover 44. Thus, the installed position of the LED 62 is not directly seen by the user through the windows 50 and 52. In other words, the LED 62 is not arranged directly under the windows 50 and 52, so that light emitted from the light-emitting element (LED 62) may travel through the light-guiding member 56 and may be selectively emitted via the illumination windows 64 and 66 and the illumination paths 80 and 86. Consequently, no spots of light will be produced on the respective touchpad units 34 and 36 in the light-emitting state and no portion of the light-emitting element will be illuminated in the shape of an eye ball. In addition, the number of parts may be reduced by sharing the light-emitting element and the light-guiding member.

To the aforementioned configuration, for example, the coating layer 58 may be formed on the upper surface side of the contact member 60 as illustrated in FIG. 9. In this case, for example, the coated surface is exposed through the window 50 and the user's finger touches the coated surface. An illumination window portion 65 is formed in the joining part 72 of the contact member 60, allowing light of the LED 62 to be emitted from the joining part 72 or the like along the peripheral surface of the window 50. Therefore, for example, part of the light passing through the illumination path 80 is selected for illumination just before reaching the surface of the joining part 72, thereby reducing or preventing the light from being diffused to other portions of the contact member 60.

Figure 10:
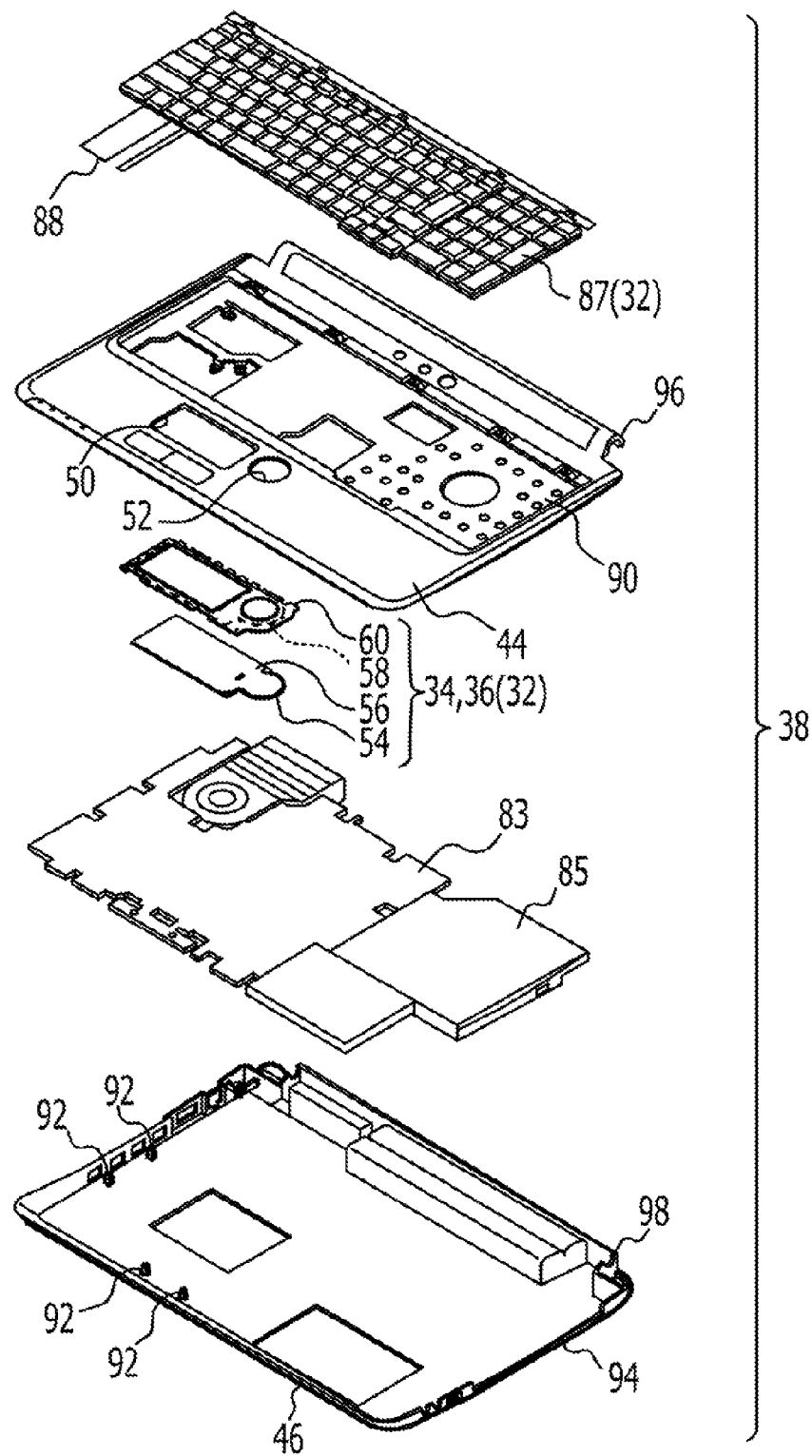
FIG. 10 is an exploded view illustrating an example configuration of a personal computer (PC)
Figure 11:
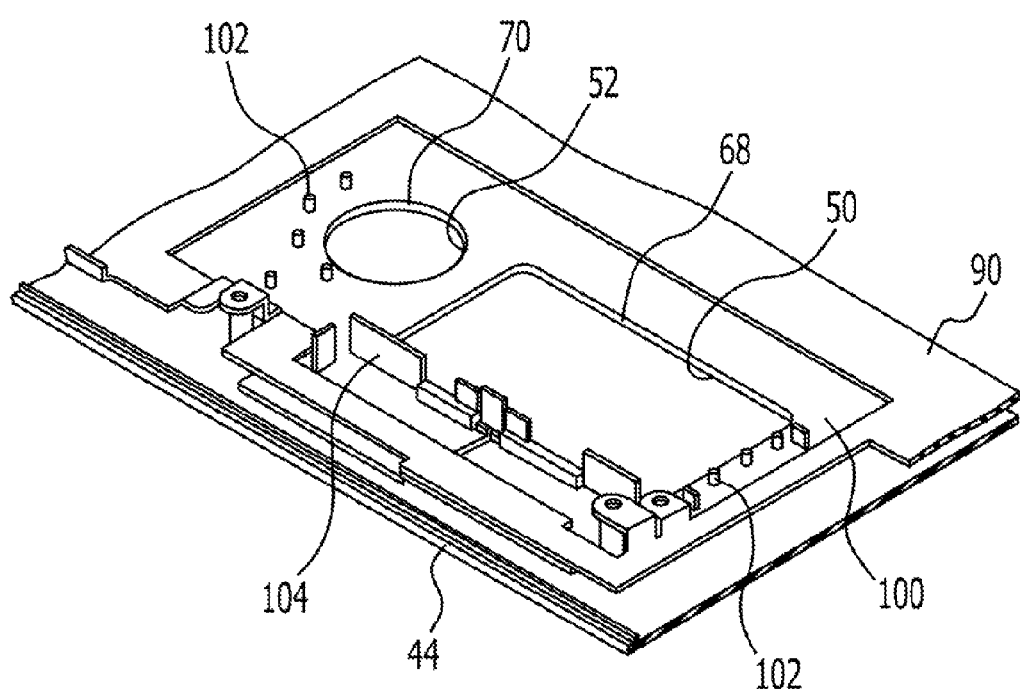
FIG. 11 is a diagram illustrating an example configuration of an inner side of an upper housing cover.
Figure 12:
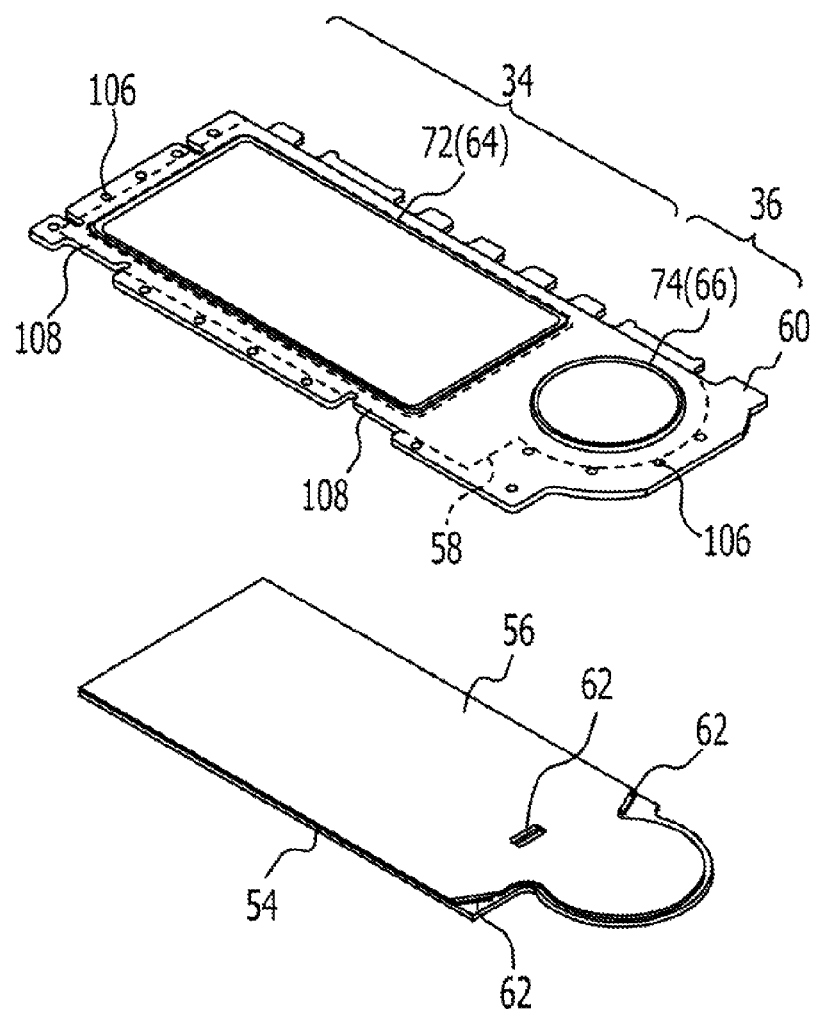
FIG. 12 is a diagram illustrating an example configuration of the touchpad unit.
Figure 13:
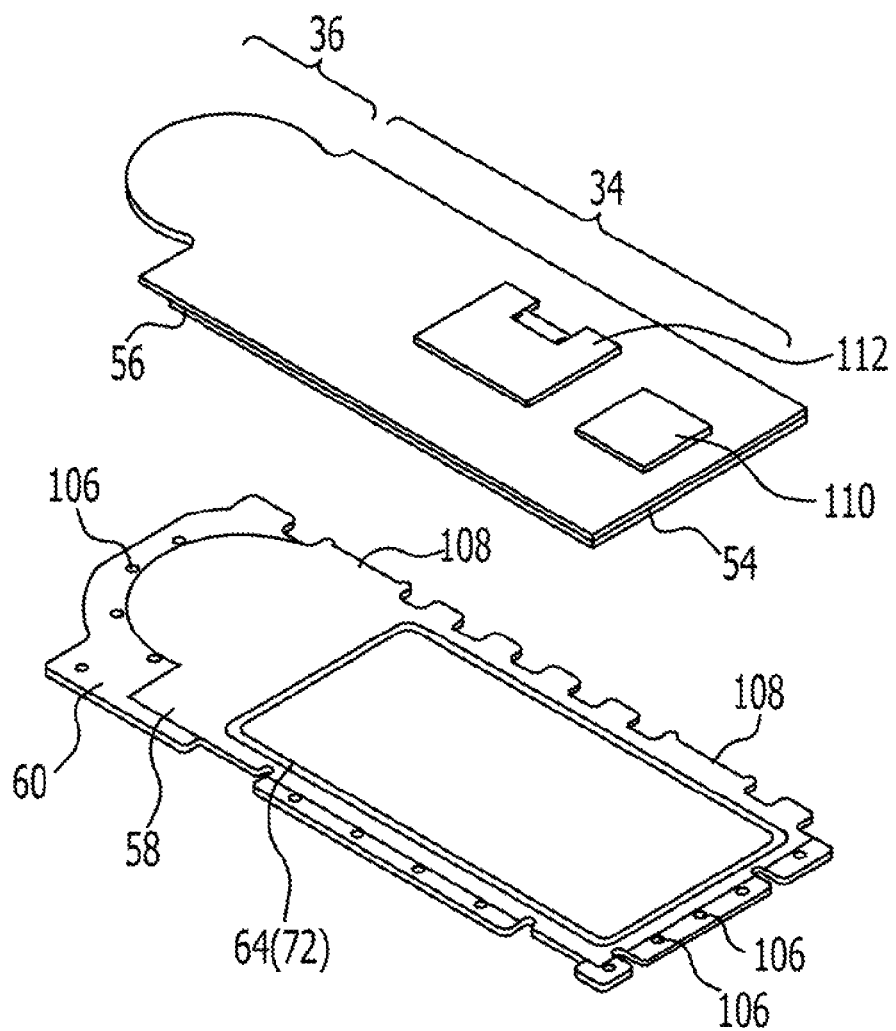
FIG. 13 is a diagram illustrating an example configuration of a back side of the touchpad unit.

Subsequently, the configuration of the PC will be described with reference to FIGS. 10, 11, 12 and 13. FIG. 10 is an exploded view illustrating an example configuration of the personal computer (PC). FIG. 11 is a diagram illustrating an example configuration of the inner side of the upper housing cover. FIG. 12 is a diagram illustrating an example configuration of the touchpad unit. FIG. 13 is a diagram illustrating an example configuration of the back side of the touchpad unit. The configuration of the PC illustrated in FIGS. 10, 11, 12 and 13 is provided for illustrative purposes and the configuration of the PC is not construed as being limited thereto.

As illustrated in FIG. 10, the main housing unit 38 of the PC 30 includes an operation section 32, an upper housing cover 44, a control board 83, a lower housing cover 46, and so on, which are laminated in order.

The operation section 32 may include, for example, a keypad 87 made of resin as well as a touchpad units 34 and 36. The operation unit 32 detects an input operation performed by pressing the keypad 87 and then sends the detection signal to the control board 83 through a connector cable 88. The control board 83 executes a character input and operates a cursor or the like displayed on a display 48 (FIG. 4).

As described above, the upper housing cover 44 has windows 50 and 52 for allowing the touchpad units 34 and 36 to be exposed to the outside, respectively. The touchpad 54, which has a contact member 60, and a light-guiding member 56, and so on are arranged and aligned with the windows 50 and 52. The upper housing cover 44 may include, for example, a reinforcing metal plate 90. A part of the reinforcing plate 90 is used as a mount on which the keypad 87 is mounted. The reinforcing plate 90 is fixed on the inner side of the upper housing corner 44 and protects the control board 83, the touchpad units 34 and 36, and so on, which are installed in the PC 30.

The control board 83 is, for example, a motherboard. The control board 83 is connected to a ODD device 85 using a disc-shaped medium, a hard-disk drive (HDD) or the like as a storage, the touchpad 54, a connector cable 88, and so on. In addition, the control board 83 includes a CPU, a RAM, and so on, which control the PC 30.

A lower housing cover 46 includes a plurality of holding members 92 which hold the control board 83 at a specified position. In addition, the lower housing cover 46 has a window 94 on the lateral side thereof to mount the ODD device 85 or the like. The lower housing cover 46 may be made of, for example, a resin-based material.

The upper housing cover 44 and the lower housing cover 46 are provided with hinge covers 96 and 98, respectively. The hinge covers 96 and 98 hold a hinge structure 42. In addition, other functional components and so on are installed in the internal space formed between the upper housing cover 44 and the lower housing cover 46.

As illustrated in FIG. 11, a mount 100 is formed on the backside of the upper housing cover 44, or the inner side of the PC 30. The touchpad 54, the contact member 60, and so on are mounted on the mount 100 to fit with the windows 50 and 52. The mount 100 includes a plurality of holding members 102 and standing wall members 104 provided for keeping the contact member 60 in place and reducing or preventing the structural components from shifting out of position by the touch of the finger or the like. Furthermore, the installed positions of the touchpad 54 and so on are surrounded by the reinforcing plate 90 placed on the upper housing cover 44.

The reinforcing plate 90 may hold, for example, part of the installed touchpad 54 or the contact member 60.

As illustrated in FIG. 12, the touchpad 54 is, for example, laminated with a light-guiding member 56 and provided with one or a plurality of LEDs 62 that avoid the light-guiding member 56. For example, the LEDs 62 are located between the touchpad unit 34 and the touchpad unit 36 and directly under the upper housing cover 44 so that the LEDs 62 are not exposed through the windows 50 and 52 of the upper housing cover 44. The positions on which the LEDs 62 are placed are covered with the coating layer 58 applied to the contact member 60. Therefore, light emitted from the LEDs 62 is not directly illuminated from the contact member 60.

The coating layer 58 is formed over most of the surface of the contact member 60. As described above, the illumination window portions 64 and 66 are formed within the coating layer 58 portion at the peripheral surfaces of the windows 50 and 52 corresponding to the joining parts 72 and 74, respectively. For example, the contact member 60 includes, on the periphery portion thereof, a plurality of locking holes 106, which are engaged with the holding members 102 of the upper housing cover 44, and a plurality of abutting portions 108 which contact and are held by the standing wall members 104.

The touchpad 54 includes a processor 110 and a connector 112 (both illustrated in FIG. 13) on the backside thereof. The processor 110 performs a process for analyzing a current value or the like detected by a sensor unit (not shown) mounted on the front side of the touchpad 54. The connector 112 is provided for sending an analysis result from the processor 110 or a control signal based on the analysis result to the control board 83 or the like. The contact member 60 has an illumination window portion 64 which is formed on the backside of the contact member 60 so as to be aligned to the coating layer 58 joined to the window 50 as described above.

Furthermore, as illustrated in FIG. 13, the contact member 60 may not include the illumination window portion 66 on the side of the touchpad 36.

Figure 14:
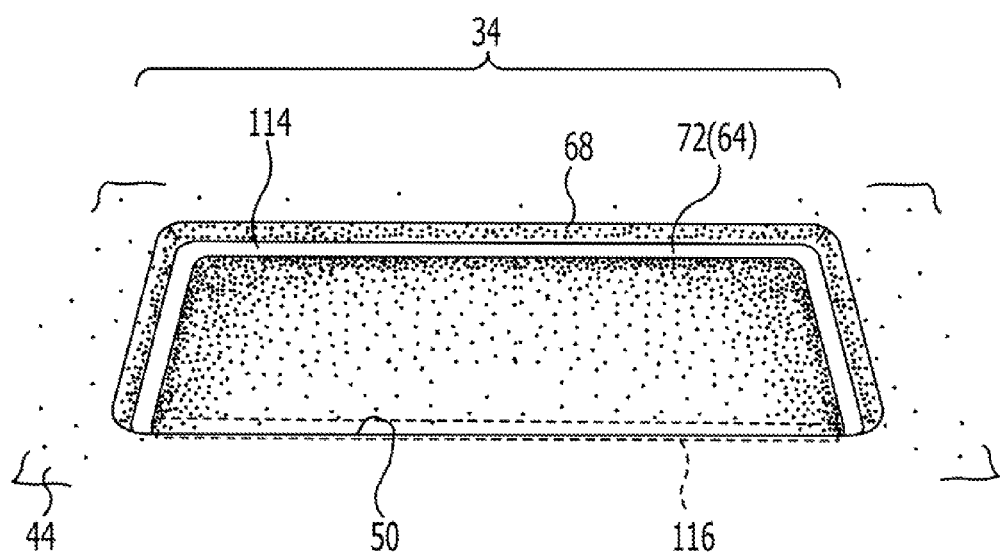
FIG. 14 is a diagram illustrating an example state where the touchpad unit is being illuminated.
Figure 15:
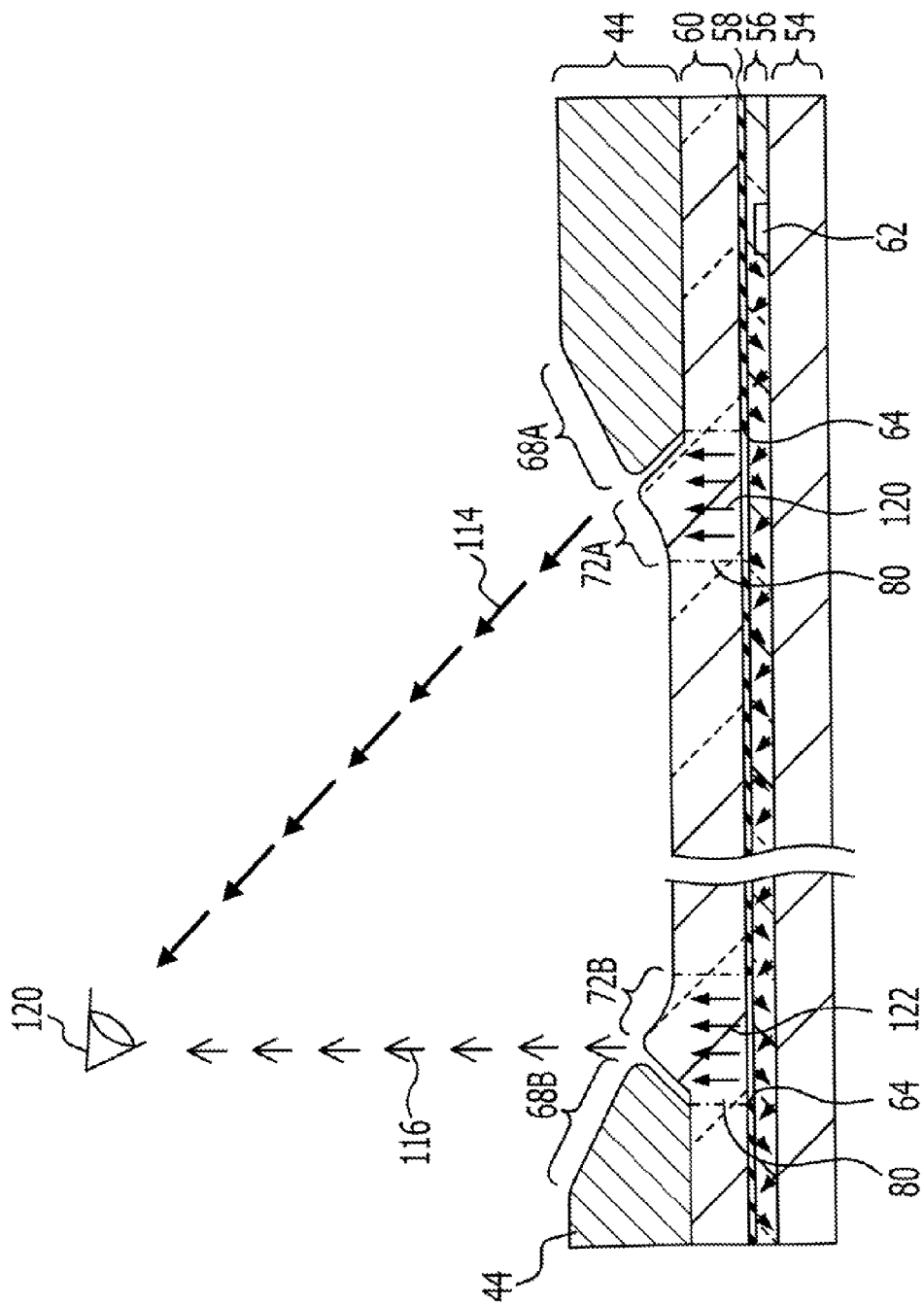
FIG. 15 is a diagram illustrating an example illumination principle of the touchpad unit viewed from the user.

Next, the illumination state of the touchpad unit will be described with reference to FIGS. 14 and 15. FIG. 14 is a diagram illustrating an example state where a touchpad unit is being illuminated. FIG. 15 illustrates an example of the illumination principle seen by the user. The configurations illustrated in FIGS. 14 and 15 are provided as an example of this embodiment and does not limit to these configurations.

Hereafter, the case where the touchpad unit 34 is illuminated will be described.

The joining part 72 of the contact member 60 is formed as a contiguous inclined surface with respect to the peripheral surface of the window 50 of the upper housing cover 44. The illumination window portion 64 of the coating layer 58 is formed in the joining portion 72. When the LED 62 emits light, as illustrated in FIG. 14, the light is illuminated along the inclined portion 68 from the illumination window portion 64. Therefore, for example, the illumination window portion 64 is illuminated brightly, while the peripheral part of the illumination window portion 64 glows faintly and radially outwards.

As described above, the gap between the end side of the window 50 and the joining part 72 is inclined at a specified angle with respect to the inclined portion 68. Therefore, when the LED 62 emits light, the gap generated in the inclined portion 68 and located at the position far from the user of the PC 30 becomes bright by radiation light 114 based on light from the LED 62. Thus, the gap is not easily seen by the user. In contrast, furthermore, the gap generated in the inclined portion 68 and located at the position close to the user is inclined at an angle so that the user cannot easily see the gap. Thus, when the LED 62 emits light, the user may see that radiation light 116 from the light of the LED 62 is glowing.

Referring to FIG. 15, the inclined surface and the gap of the touchpad unit and the appearance of light being emitted will be described.

A user 120 is able to look at the touchpad unit 34 of the PC 30 in an oblique direction. For example, an inclined portion 68A and a joining part 72A are located on the far side of the user 120, while the inclined portion 68B and the joining part 72B are located on the near side of the user 120. In this case, for example, the light emitted from the LED 62 is guided entirely around the touchpad 54 by repeating reflection or the like in a light-guiding member 56 between the coating layer 58 and the touchpad 54. Light beams 122 passing through the illumination window portion 64 of the coating layer 58 are guided toward the joining parts 72A and 72B of the contact member 60 through the illumination path 80. Since light beams 122 are guided in the light-guiding member 56 and the illumination window portion 80 through substantially the same light-guiding path, the light beams 122 have substantially the same degree of luminance.

Light beams 122 which have reached the contact member 60 are emitted from the window 50 through joining parts 72A and 72B. At this time, the inclined surface and the gap on the side of the joining part 72A generated by the junction are directed toward the user 120, so that the user 120 may see a larger amount of light 114. On the other hand, the inclined surface and the gap on the side of the joining part 72B generated by the junction are not directed toward the user 120, so that the user 120 will not easily see the gap. Thus, the amount of light 116 seen by the user 120 may be decreased.

The aforementioned configuration improves the adhesiveness of the joined portion by inclining the housing cover 44 and the contact member 60 at a specified angle. Additionally, this leads to a decrease in visibility of the gap between the housing cover 44 and the contact member 60. When illuminating the touchpad unit, the visibility of the touchpad being illuminated is increased. Furthermore, this also leads to an improvement in processability of the joining part of the housing cover 44 and the contact member 60, thereby attaining an improvement in ease of assembling the PC.

Third Embodiment

Figure 16:
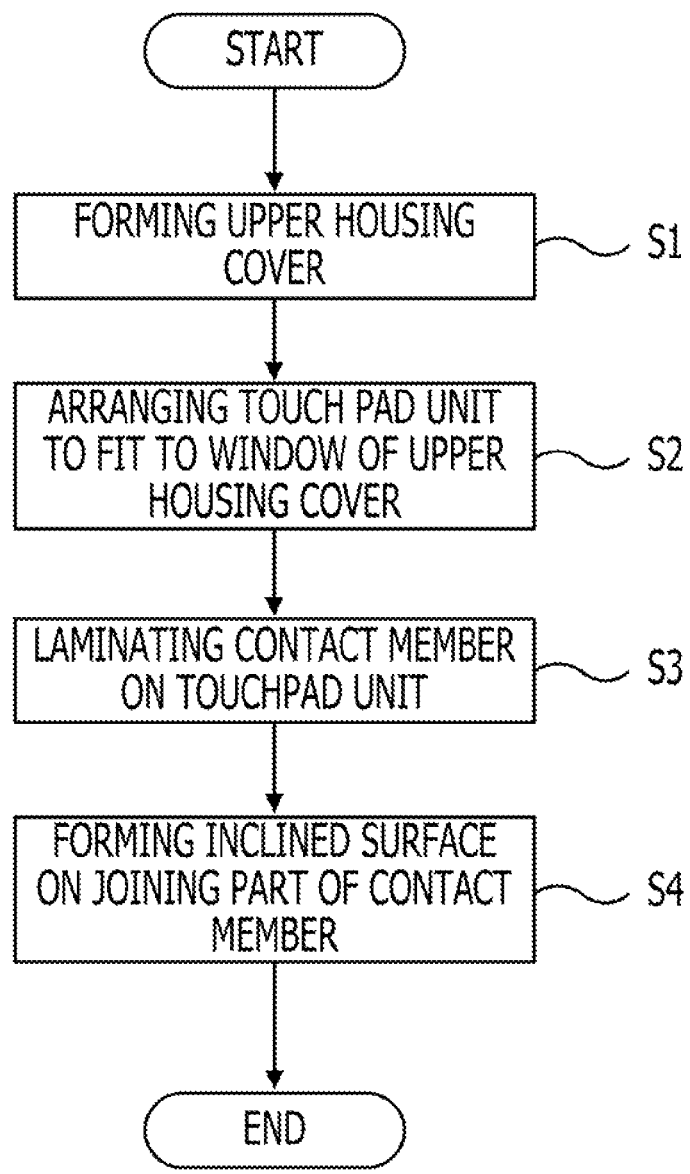
FIG. 16 is a flowchart illustrating an example process for manufacturing an electronic apparatus according to a third embodiment.

Referring to FIG. 16, a third embodiment will be described. FIG. 16 is a flowchart illustrating an example process for manufacturing an electronic apparatus according to a third embodiment. The contents, procedures, and so on of the process illustrated in FIG. 16 are provided as an example of this embodiment. Thus, the process is not construed as being limited thereto.

This manufacturing process is an example of the manufacturing method of the electronic apparatus of the present disclosure. The manufacturing process includes, for example, forming an upper housing cover (Operation S1) and arranging a touchpad unit to fit to a window of the upper housing cover (Operation S2). The manufacturing process also includes laminating a contact member on the touchpad unit (Operation S3) and forming an inclined surface on a joining part of the contact member (Operation S4).

Forming the upper housing cover forms the window in the upper housing cover and inclines the peripheral surface of the window inwardly (Operation S1). In this operation, for example, a resin material may be molded to integrally form an upper housing cover 44 together with windows 50 and 52 in which touchpad units 34 and 36 are arranged, a mount 100 on which a touchpad 54 and so on are mounted, a plurality of holding members 102, and a plurality of standing wall members 104. Inclined portions 68 and 70 are formed on the windows 50 and 52 so that the inner sides of the peripheral surfaces of the windows 50 and 52 are inclined, respectively. Furthermore, a reinforcing plate 90 is placed on the inner side of the upper housing cover 44.

In arranging the touchpad units to fit to the windows of the upper housing cover, for example, a touchpad 54 having a light-guiding member 56 is installed by fitting the touchpad 54 to the holding members 102 and the standing wall members 104 of the mount 100 (Operation S2).

In laminating the contact member on the touchpad unit, for example, joining parts 72 and 74 are formed in a part of the contact member 60, a coating layer 58 is applied to the contact member 60, and the contact member 60 is arranged to fit to the holding members 102 and the standing wall members 104 of the mount 100 and to be exposed through the windows 50 and 52 (Operation S3).

In forming the inclined surface on the joining part of the contact member, the joining parts 72 and 74 of the contact member 60 are joined with the upper housing cover 44 so that the joining parts 72 and 74 become contiguous inclined surfaces with respect to the inclined portions 68 and 70 of the upper housing cover 44 (Operation S4). In this case, as described above, for example, the joined surface portions 76 and 78 and the joined surface portions 82 and 84, which join the upper housing cover 44 and the contact member 60 together, are formed. Furthermore, the joined surface portions 76 and 78 and the joined surface portions 82 and 84 are formed obliquely so that at least one of the joining parts 72 and 74 of the contact member 60 and the upper housing cover 44 may be at an angle of about 90 degrees or more with respect to the inclined reference plane.

According to this configuration, the joined surface portion of the touchpad unit serves as a contiguous surface together with the inclined window leading to an improvement in operability of the touchpad. In addition, the joining surface of the contact member and the joining surface of the upper housing cover are inclined leading to an improvement in ease of assembling. Therefore, the accuracy of junction may be enhanced. Furthermore, the gap formed in the joined surface portion is formed at an angle so that the gap is not easily seen by the user.

[Advantages and Characteristic Features of the First to Third Embodiments and Other Embodiments]

(1) In the present embodiment, the joined portion between the upper housing cover 44 provided as a cover member and the contact member 60 is formed in the middle of the inclined surface. In addition, the cover unit and the contact member are inclined at an angle of about 45 degrees.

(2) In the present embodiment, the contact portion of the touchpad unit 34 and the contact portion of the touchpad unit 36 for scroll operation are provided as different components. Therefore, for example, the time and effort for coating the touchpad units 34 and 36 are saved, thereby reducing costs. For example, the present embodiment is not a technology for making the upper housing cover 44 transparent and entirely coating the PC but one for illuminating the contact portion of the touchpad unit using the light-guiding member 56 such as a light-guiding plate.

(3) When the contact member 60 and the upper housing cover 44 are provided as different components, a narrower gap is more preferable. In the present embodiment, the joined portion is provided as an inclined surface. In addition, the inclined surface and the opposite tapered portion are provided as abutting surfaces to increase the feel of the gap by the finger. In other words, the present embodiment improves the accuracy of junction by providing the joined portion with a tapered surface.

(4) In the present embodiment, an inclined surface is formed on the window in which the touchpad unit is arranged. Then, light is emitted from the inclined surface to illuminate the frame of the window, thereby increasing design visibility.

(5) In the present embodiment, the need for accuracy when joining the components may be reduced by joining the cover unit and the joining member together without shaping the ends of the respective components in the middle of the inclined surface, thereby increasing the flexibility of design.

(6) In the present embodiment, an electronic apparatus and a method for manufacturing the same of the present disclosure is to join a contact member and a housing cover together while preventing the generation of a gap therebetween to decrease visibility of the gap. Thereby, the gap caused in the joined portion between the cover unit and the joining member is not easily seen by the user.

Figure 17:
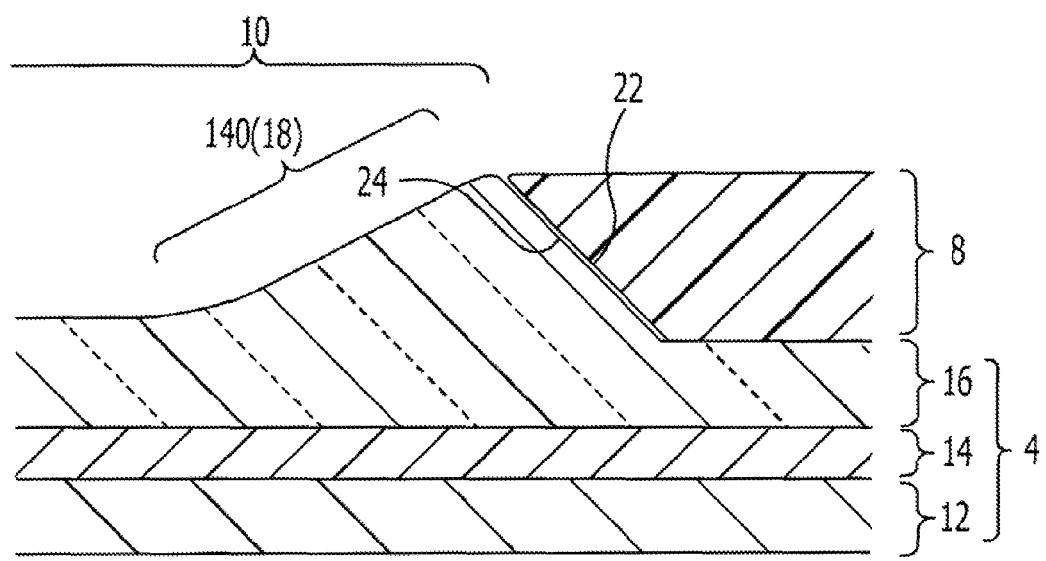
FIG. 17 is a cross-sectional diagram illustrating an example joining surface between an upper housing cover and a contact member according to another embodiment.

(7) In the present embodiment, the contact member 16 and the upper housing cover 8 are joined at the inclined portion of the window 10, but the present embodiment is not limited thereto. For example, as illustrated in FIG. 17, only the joining part 140 of the contact member 16 may form an inclined portion. The contact member 16 and the upper housing cover 8 may be joined together on the end side of the window 10. In this case, as described above, the joining part 140 and the upper housing cover 8 may be formed such that the joined surface portion 24 of the contact member 16 and the joined surface portion 22 of the upper housing cover 8 may be inclined with respect to the vertical reference plane. This configuration may also make the gap between the joined portions inclined. Thus, the user cannot easily see the gap.

(8) In the above embodiment, the angle of the joined portion has been described such that the upper housing cover 9 is formed at an acute angle. However, the embodiment is not limited thereto. For example, the joined portion of the upper housing cover 8 may be formed to be perpendicular to or to have an obtuse angle with respect to the horizontal plane. Therefore, the joining part 18 of the contact member 16 may be formed in a tapered shape instead of the upper housing cover 8.

Figure 18:
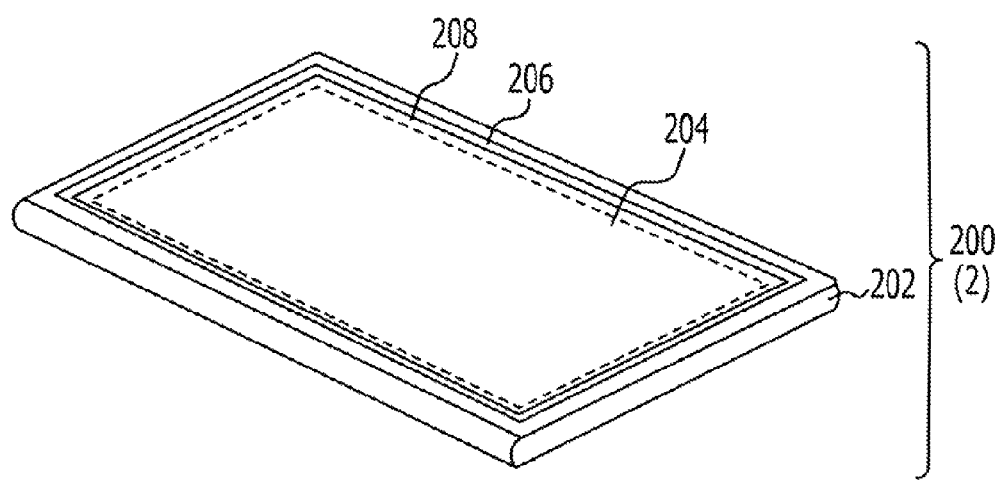
FIG. 18 is a diagram illustrating an example configuration of a tablet according to another embodiment.

(9) In the present embodiment, the PC 30 has been described as an example electronic apparatus. However, the present embodiment is not limited thereto. Alternatively, for example, the present embodiment may be applied to a tablet 200, which is used as an input device externally connected to an electronic apparatus 2, as illustrated in FIG. 18. For example, the tablet 200 includes a housing section 202 and a touch panel section 204. For example, the tablet 200 is connected to an electronic apparatus, such as a PC, via an interface of a Universal Serial Bus (USB) or the like and performs an input operation to the electronic apparatus by a sliding movement of the finger, a stylus, or the like on a touch panel section 204. Just as in the case with the aforementioned embodiment, for example, an inclined portion 206 may be formed in the peripheral portion of the housing section 202 where the touch panel section 204 is exposed, while an inclined portion 208 may be formed in the peripheral portion of the touch panel section 204 to join the housing section 202 and the touch panel section 204 together.

Figure 19:
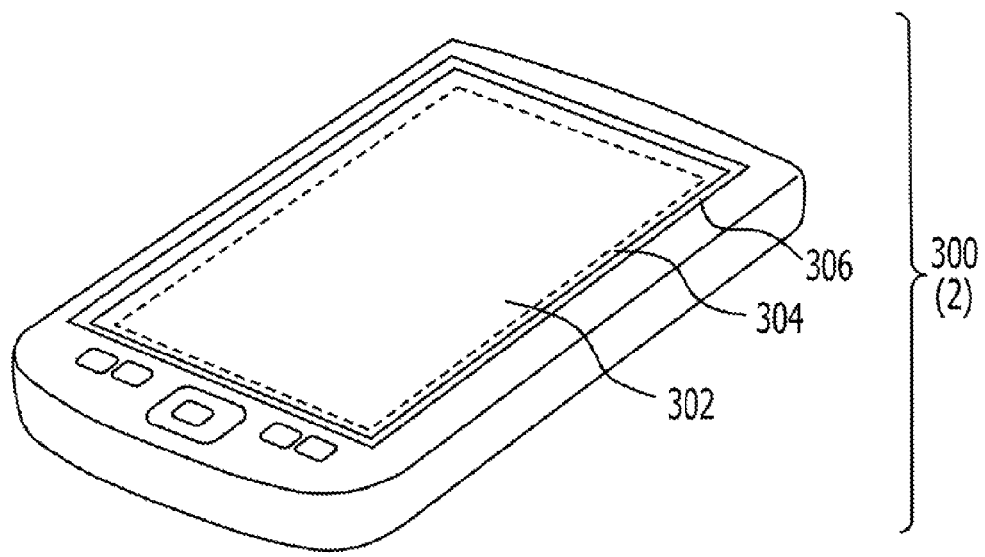
FIG. 19 is a diagram illustrating an example configuration of a personal digital assistant (PDA) according to another embodiment.
Figure 20:
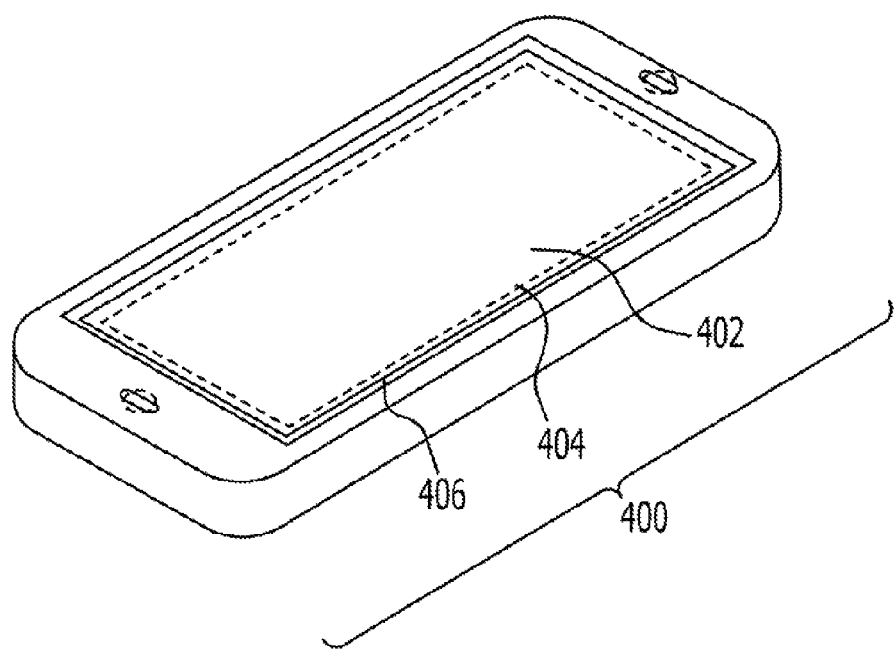
FIG. 20 is an example configuration of a cell phone according to another embodiment.

(10) As illustrated in FIG. 19, for example, the present embodiment may be applied to a Personal Digital Assistant (PDA), which includes a touch-panel type display 302 having inclined portions 304 and 306 as another example electronic apparatus. As illustrated in FIG. 20, for example, the present embodiment may be applied to a cell phone 400 having a touch-panel type display 402 on which inclined portions 404 and 406 are formed.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. An electronic apparatus, comprising:
 a cover having a window through which an operation section is exposed, the window has an inwardly inclined peripheral surface as an inclined portion; and
 a touchpad arranged substantially within the window, the touchpad includes a contact member covering the surface of the touchpad exposed through the window, the contact member has a joining part for the cover, wherein
 the joining part of the contact member includes an outwardly inclined surface that forms a substantially contiguous inclined surface together with the inclined portion of the cover, and
 the outwardly inclined surface of the joining part of the contact member does not overlap any portion of the inwardly inclined peripheral surface of the cover.

2. The electronic apparatus according to claim 1, wherein
 each of the joining part and the inclined portion have their respective joined surface portions between the joining part and the inclined portion, and
 the joined surface portion of either the joining part or the inclined portion is inclined at an angle of about 90 degrees or more with respect to an inclined reference plane of the cover.

3. The electronic apparatus according to claim 1, wherein
 the touchpad includes a light-emitting element and a light-guiding member guiding light from the light-emitting element to a part or all of the contact member, and
 the contact member includes an illumination window portion emitting the light guided by the light-guiding member.

4. The electronic apparatus according to claim 3, wherein
 the illumination window portion is formed at a position corresponding to the inclined portion of the joining part.

5. The electronic apparatus according to claim 1, wherein the contact member is secured to the touchpad.

6. The electronic apparatus according to claim 5, wherein the contact member is laminated on the touchpad.

7. A method of manufacturing an electronic apparatus, comprising:
 forming a cover having a window that has an inwardly inclined peripheral surface as an inclined portion;
 arranging a touchpad in the window;
 securing a contact member on the touchpad and arranging the contact member to cover the surface of the touchpad exposed through the window, the contact member has a joining part that includes an outwardly inclined surface; and
 forming a substantially contiguous inclined surface together with the cover by the joining part of the contact member and the inclined portion of the cover,
 wherein the outwardly inclined surface of the joining part of the contact member does not overlap any portion of the inwardly inclined peripheral surface of the cover.

8. The method according to claim 7, wherein
 each of the joining part and the inclined portion have their respective joined surface portions between the joining part and the inclined portion, and
 the method further includes arranging the joined surface portion of either the joining part or the inclined portion at an angle of 90 degrees or more with respect to an inclined reference plane of the cover.

9. The method according to claim 7, wherein the securing comprises laminating.

* * * * *